April 19, 1927.
J. B. REILLY ET AL
1,625,392
TOOL FOR CUTTING AND REMOVING PIPE FROM WELLS
Original Filed July 19, 1923
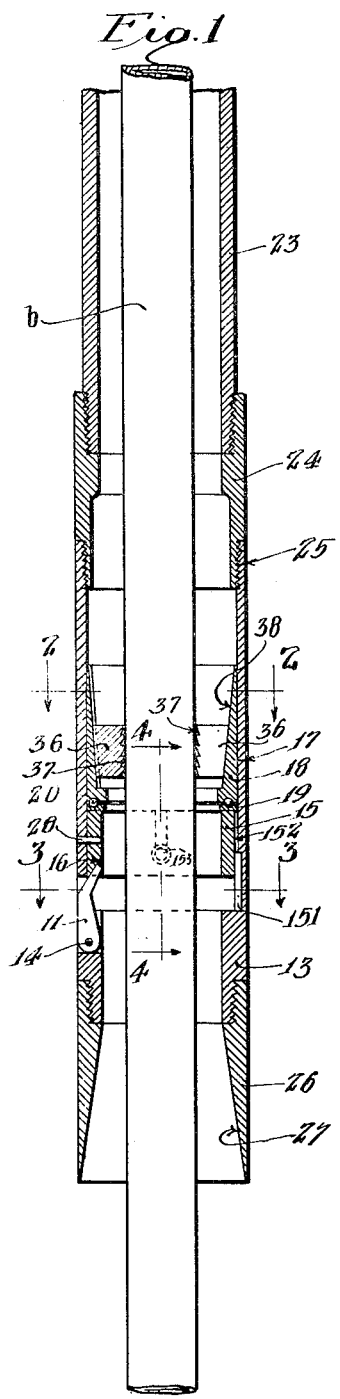
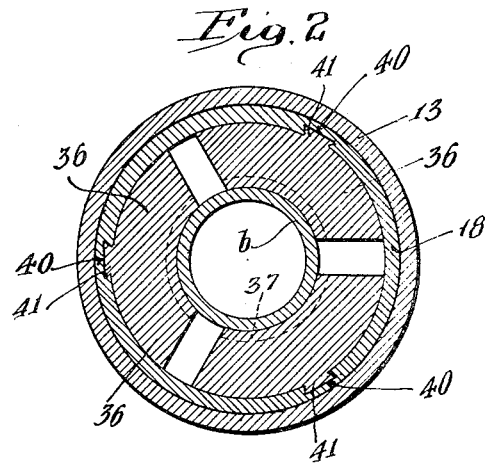
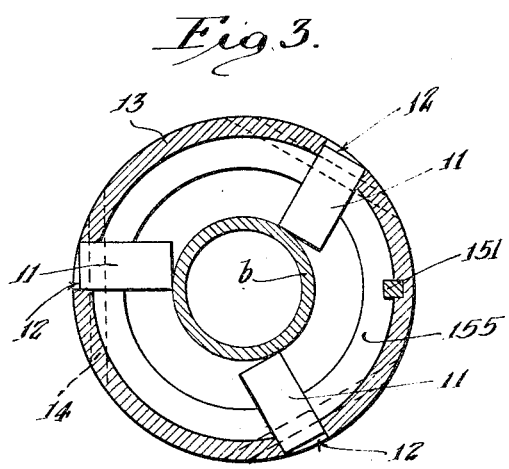
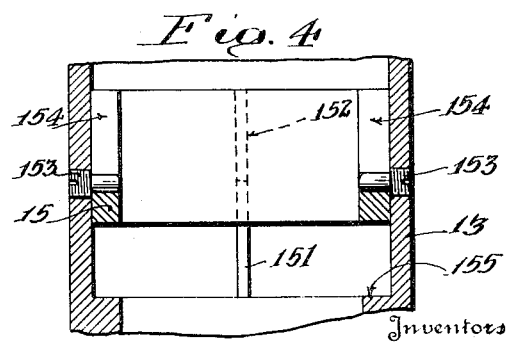
Inventors
John B. Reilly
Charles H. Stone
By Lyon & Lyon
Attorneys Patented Apr. 19, 1927.

1,625,392

UNITED STATES PATENT OFFICE.

JOHN B. REILLY, OF WHITTIER, AND CHARLES H. STONE, OF BREA, CALIFORNIA, ASSIGNORS TO KAMMERER CORPORATION, OF SANTA FE SPRINGS, CALIFORNIA, A CORPORATION OF CALIFORNIA.

TOOL FOR CUTTING AND REMOVING PIPE FROM WELLS.

Original application filed July 19, 1923, Serial No. 652,511. Divided and this application filed January 20, 1925. Serial No. 3,642.

This invention relates to that type of tool employed in the well drilling art for cutting pipe in the well, and it can also be used for removal of the cut-off scections of the pipe. Such a tool is in frequent demand for cutting the drill pipe or stem when it or the bit becomes stuck in the hole.

The invention is an improvement over that disclosed in United States Letters Patent No. 1,277,600, issued to George Kammerer, September 3rd, 1918. This application is a division of our copending application filed July 19, 1923, Serial Number 652,511, which was a continuation as to common subject matter of our earlier application Serial No. 584,277 filed August 25, 1922.

An important object of the invention is to simplify the tool, reducing the number of working parts so as to make it less liable to get out of order in use.

Another important object is to mount the cutter blades in a manner to permit of the tool being inserted in a casing of small diameter relative to the diameter of the pipe to be cut within the casing.

Another object is to provide for holding of the cutter blade-actuating member in retracted position and for release thereof by upward motion of the tool body.

Another object is to make provision for semi-automatic feeding of the cutter blades to the pipe or stem being cut.

Another object is to provide for cutting of the pipe at any desired point without the necessity of co-acting between the tool and the pipe collar or tool joint.

The accompanying drawings illustrate the invention:

Figure 1 is a longitudinal section of a tool embodying the invention, a fragment of the member for rotating it and a fragment of the pipe being operated upon also being shown. The parts are in the positions they occupy when the tool is being lowered into the well.

Figs. 2 and 3 are enlarged plan sections on the lines indicated by 2—2, 3—3, respectively, Fig. 1. In Fig. 3 the cutter blades are in pipe-cutting position.

Fig. 4 is an enlarged fragmental vertical section on the line indicated by 4—4, Fig. 1, the pipe being omitted.

There is provided any desired number of cutter blades 11 movably mounted in longitudinally extending slots 12 in a tubular body 13. In this instance the cutter blades 11 are oscillatively mounted in the slots 12, being pivoted at 14 to the body 13. The tubular body 13 is adapted to be lowered over the pipe or drill stem that is to be cut. Such pipe will be maintained substantially concentric of the body 13, while the cutting operation is progressing, because of the provision of a plurality of the cutter blades 11, there being, in this instance, three such blades arranged equi-distantly around the body. The cutter blades 11 preferably extend upwardly from their pivots 14 so that, even though the cutter were to swing inwardly into engagement with the pipe over which the tool is being lowered, said cutter blades will not catch, as the tool is lowered, upon any shoulders or other projections that may be on the pipe. The cutter blades would tend to drag over the pipe couplings during downward motion of the tool and be deflected outwardly and upwardly.

To positively force the cutter blades inwardly into engagement with the drill pipe that is to be cut, there are provided cutter blade-actuating means comprising, in this instance, a blade-engaging member 15. Though said blade-engaging member may be of any suitable shape, we prefer to make it annular as shown. When the member 15 is held stationary, the member 13 is raised, said member 15 engages the upper ends of the cutter blades 11 and turns said blades inwardly and downwardly to the cutting position, as in Fig. 3.

Preferably the lower end of the member 15 is provided with slots 16, the outer walls of which are beveled inwardly and upwardly. These slots register with the blades 11 and the beveled walls function as cam faces for engaging the cutter blades. Preferably the upper ends of the cutter blades are beveled complementarily to the beveled walls of the slots 16 so that the blades will ride smoothly on the side beveled walls.

The upper portion of the tubular body 13 is of enlarged internal diameter, as indicated at 17, and within this enlarged portion is mounted a bearing comprising upper and lower tubular ball-race members 18, 19 and balls 20 between them so as to constitute an antifriction bearing. Thus, the elements 19, 20 constitute means rotatably connecting the member 18 to the member 15.

The upper end of the tubular body 13 is suitably connected to an operating member which, in this instance, is formed by tubing 23, the connection between the tubing being effected by a coupling 24 to which the body 13 is screwed as indicated at 25.

In the drawings the body 13 is formed, in part, by a shoe 26 which is internally beveled outwardly and downwardly at its lower end at 27 so that, if the shoe strikes an obstruction while it is descending, it will cut the obstruction away.

The member 15 is temporarily secured to the body 13, while the tool is being lowered over the drill pipe into the well, so as to prevent rotative movement between the cutter blades and the cutter blade-engaging member 15, thus avoiding actuation of the blades. In this instance the rotative motion is prevented by a shearing pin or pins 28 connecting the body 13 to the member 15.

The member 15 is prevented from turning relative to the body 13 by spline 151 fixed in said body and projecting into a spline-way 152 in the outer face of the member 15. To limit upward motion of the member 15, after shearing of the pins 28 as will be made clear hereinafter, the body 13 is provided with screws 153 projecting into slots 154 in the member 15, said slots terminating at their lower ends above the lower end of the member 15.

To limit downward motion of the member 15, after shearing of the pins 28, the body 13 is provided with an internal shoulder 155 to engage the lower end of the member 15.

Shiftably mounted in the member 18 is a clamping means comprising, in this instance, slips 36 that may be provided on their inner faces with teeth 37. The slips 36 are wedge-shape and slide within the internally beveled bearing member 18 which thus constitutes wedging means, the bevel being downwardly and inwardly as indicated at 38 so that, as the slips 36 descend, they are wedged inwardly into engagement with the drill pipe b that is to be cut.

Interengaging guides are provided on the slips 36 and member 18 and such guides are formed, in this instance, of longitudinal grooves 40 on the inner face of the member 18 and longitudinal tongues 41 on the outer faces of the slips 36. The grooves and tongues are preferably dovetailed, as shown.

In practice, when it is desired to cut a string of drill pipe in the well, the tool with the shearing pins 28 in place will be lowered over the drill stem by means of the tubing 23 to approximately the level at which the drill pipe is to be cut. Then the tool will be raised to cause the slips 36 to be wedged tightly against the drill pipe so as to hold the member 15 stationary, and thus effect shearing of the pins 28 and thus release the body 13 from the member 15, whereupon the member 15 will descend, causing the cam faces 16 to wedge the cutter blades 11 inwardly into engagement with the drill pipe b. The tubing 23 will then be lowered to position the cutter blades 11 at any desired level below that at which the shearing of the pins 28 was effected. Then the tubing 23 will be raised so as to wedge the slips 36 inwardly against the pipe, as in Fig. 1, thus holding the member 15 stationary so that the cutter blades 11 will be forced with sufficient pressure against the drill pipe for the cutting operation. Then the tubing 23 will be rotated by any of the usual mechanisms employed for such purpose, so as to cause the cutter blades 11 to cut the drill pipe. The cutter blades 11 will be forced further and further inwardly, as the depth of the cut increases, by slightly raising the tubing 23, to thereby cause the cam faces of the slots 16 to wedge the cutter blades inwardly.

After the cutting operation has been completed, the tubing 23 will be withdrawn from the well and with it the body 13 and its associated parts, and, since the slips 36 firmly clamp the cut-off section of the drill pipe, this withdrawing movement causes said cut-off section, or "fish" as it is commonly termed in this art, to be raised at the same time until the upper end of said fish is above the top of the well, whereupon the fish will be hoisted out of the well. If it be necessary to remove more of the drill stem, the tool will be lowered again to make another cut and then raised to elevate the fish. Thus the cutting operations and raising of the cut-off sections of the drill pipe will be continued until the well is cleared of the same, or as much of it as it is desirable to remove.

It is to be especially noted that, when the cutter blades are collapsed, they are approximately in vertical position or parallel with the pipe that is to be cut, thus occupying much less radial space than when in cutting position and enabling the tool to be inserted in a casing of much smaller diameter, relative to the diameter of the drill pipe, than is possible with the tool disclosed in the above identified Letters Patent.

When the shearing pins 28 are uncut, the screws 153 engage the bottom walls of the slots 154, thus preventing shearing of said pins in event of projections on the drill pipe catching and tending to hold the member 15 during downward travel of the tool.

In the above description, the tubular members 13, 15 are seen to be relatively movable, the cutter blades are oscillative from collapsed position into cutting position by relative movement between the members 13, 15 to cut the pipe, and the slips 36 engage the drill pipe and hold the member 15 against upward movement relative to said pipe, and the tubing 23 constitutes means connected with the member 13 to move said member.

We claim:

1. A tool of the character described comprising a tubular body adapted to slip over a pipe, a cutter blade movably mounted in the body, a cutter blade-actuating member shiftably mounted in the body and engageable with the blade upon upward movement of the blade to operate said blade, slips, and an internally outwardly and upwardly beveled member slidably fitting in the body to wedge the slips into engagement with the pipe and connected with the blade-actuating member and operating to prevent upward movement of the blade-actuating member when the body is raised.

2. A tool of the character described comprising a tubular body adapted to slip over a pipe, slips inside of the body, means operated by upward movement of the body to force the slips into engagement with the pipe and means to thereafter cut the pipe below the slips.

3. A tool of the character described comprising a tubular body adapted to slip over a pipe, means to engage and positively grip a pipe at any portion of its length, and means operatable by relative movement between the body and pipe-engaging means when the pipe is engaged by said means to cut the pipe below the pipe-engaging means.

4. A tool of the character described comprising a tubular body, a cutter blade movably mounted in the tubular body, cutter blade-engaging means to move the cutter blades into engagement with the pipe, a shear pin connecting the body and said means, and a slip operable by upward movement of the tubular body to engage the pipe and hold the cutter blade-engaging means against upward movement.

5. A tool of the character described comprising a tubular body, a cutter blade movably mounted in the tubular body, cutter blade-engaging means to operate the cutter blade into engagement with the pipe, means releasable by moving the tubular member when the cutter blade-engaging means are held to hold said last means from operating the cutter blade, and a slip operable by upward movement of the tubular body to engage the pipe exteriorly and hold the cutter blade-engaging means against upward movement.

6. A tool of the character described comprising tubular members one inside of the other, a cutter blade movably mounted on one of the tubular members and operable by longitudinal movement thereof in one direction to effect movement of the cutter blade relative to said member, slips, wedging means for the slips connected with the other tubular member and operating on downward movement of the slips relative to the wedging means to engage the pipe that is to be cut, and yielding means tending to prevent longitudinal movement of the first mentioned tubular member relative to the second mentioned tubular member.

7. A tool of the character described comprising tubular members one inside of the other, a cutter blade movably mounted on one of the tubular members and operable by longitudinal movement thereof in one direction to effect movement of the cutter blade relative to said member, slips, wedging means for the slips rotatably connected with the other tubular member and operating on downward movement of the slips relative to the wedging means to engage the pipe that is to be cut, and yielding means tending to prevent longitudinal movement of the first mentioned tubular member relative to the second mentioned tubular member.

8. A tool of the character described comprising tubular members one inside of the other, a cutter blade movably mounted on one of the tubular members and operable by longitudinal movement thereof in one direction to effect movement of the cutter blade relative to said member, slips, wedging means for the slips connected with one of the tubular members and operating on downward movement of the slips relative to the wedging means to engage the pipe that is to be cut, and yielding means tending to prevent longitudinal movement between the tubular members.

Signed at Los Angeles, Calif., this 15 day of January, 1925.

JOHN B. REILLY.
CHARLES H. STONE.